United States Patent [19]

Sugiyama et al.

[11] Patent Number: 4,648,724
[45] Date of Patent: Mar. 10, 1987

[54] STATIC PRESSURE AIR SURFACE STAGE

[75] Inventors: Sadao Sugiyama, Shiga; Hiroshi Goto, Suita, both of Japan

[73] Assignee: Omron Tateisi Electronics Co., Kyoto, Japan

[21] Appl. No.: 756,103

[22] Filed: Jul. 18, 1985

[30] Foreign Application Priority Data

Jul. 20, 1984 [JP] Japan .................. 59-151549

[51] Int. Cl.$^4$ .................. F16C 17/26; F16C 32/06
[52] U.S. Cl. .................. 384/9; 384/12
[58] Field of Search .................. 308/5 R, 3 R, 3 A; 384/100, 9, 12, 13

[56] References Cited

U.S. PATENT DOCUMENTS

| | | | |
|---|---|---|---|
| 3,053,583 | 9/1962 | Shaw | 308/5 R |
| 3,417,225 | 12/1968 | Christian | 308/5 R X |
| 3,439,581 | 4/1969 | Wilkins | 308/5 R X |
| 3,582,159 | 6/1971 | Uhtenwoldt | 308/5 R |
| 3,583,774 | 6/1971 | Degast | 308/5 R |

OTHER PUBLICATIONS

H. Kinoshita, T. Saito, M. Kanai, K. Miwa, and T. Deguchi, "XY Stage of Static Pressure Air Guiding Type", Sep. 5, 1980.

Primary Examiner—Stuart S. Levy
Assistant Examiner—Thomas R. Hannon
Attorney, Agent, or Firm—Wegner & Bretschneider

[57] ABSTRACT

A static pressure air surface stage which is adapted to control to the utmost the deflection of the movable guide caused by the reaction forces of the bearing to ensure the stable provision of the better stage run precision. The bearing pads of the movable guides are oppositely disposed by a pair on both side faces of the stationary guides.

1 Claim, 5 Drawing Figures

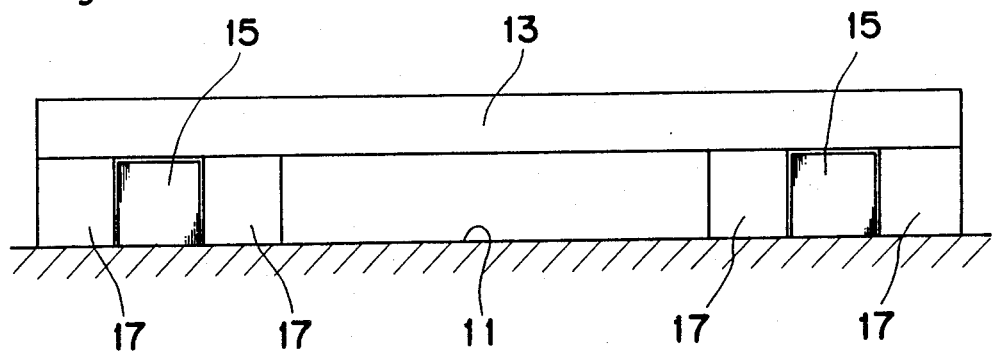
Fig. 2
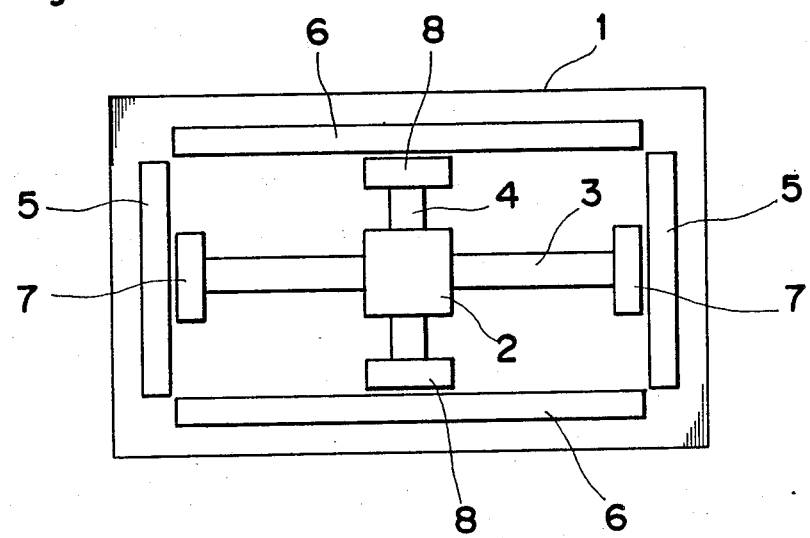
Fig. 4 - PRIOR ART
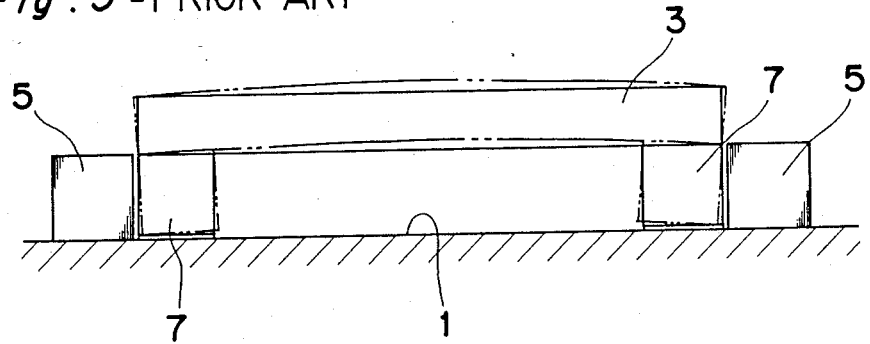
Fig. 5 - PRIOR ART

STATIC PRESSURE AIR SURFACE STAGE

BACKGROUND OF THE INVENTION

The present invention relates to a static pressure air surface stage or a float stage which is applied in superprecision measuring instruments, superprecision working machines, semiconductor manufacturing apparatuses requiring superprecision positioning operations.

Conventionally a static pressure air surface stage was described at page 207 of the thesis collection, Springtime Science Lecture Meeting, 1982 precision Machine Society.

As shown in FIG. 4 and FIG. 5, the surface stage is composed of a movable guide 3 which guides a stage 2 in a X-axis direction on a surface plate 1, a movable guide 4 which guides the stage 2 in a Y-axis direction, bearing pads 7, 7, 8, 8 disposed at both the ends of the respective movable guides 3, 4 and on the inner sides of the stationary guides 5, 6.

In the case of the conventional construction, reaction forces were applied upon the bearing pads 7, 8 because of the provision of the outer stationary guides 5, 6 through the blow-off operation of the compressed air from the bearing pads 7, 8. The movable guides 3, 4 were deflected because of the reaction forces of the bearing pads 7, 8, the reaction forces making it difficult to provide the better running precision of the stage 2.

SUMMARY OF THE INVENTION

Accordingly, an object of the present invention is to provide a static pressure air surface stage or a float stage which controls to the utmost the deflection of the movable guide caused by the reaction forces of the bearing to ensure the stable provision of the better stage run precision.

The present invention is characterized in that the bearing pads of the movable guides are oppositely disposed by a pair on both side faces of the stationary guides.

BRIEF DESCRIPTION OF THE DRAWINGS

This and other objects and features of the present invention will become apparent from the following description taken in conjunction with the preferred embodiment thereof with reference to the accompanying drawings, in which;

FIG. 2 is a simplified front view thereof,

FIG. 4 is a plan view showing the conventional embodiment, and

FIG. 5 is simplified front view thereof.

DETAILED DESCRIPTION OF THE INVENTION

Figure 1:
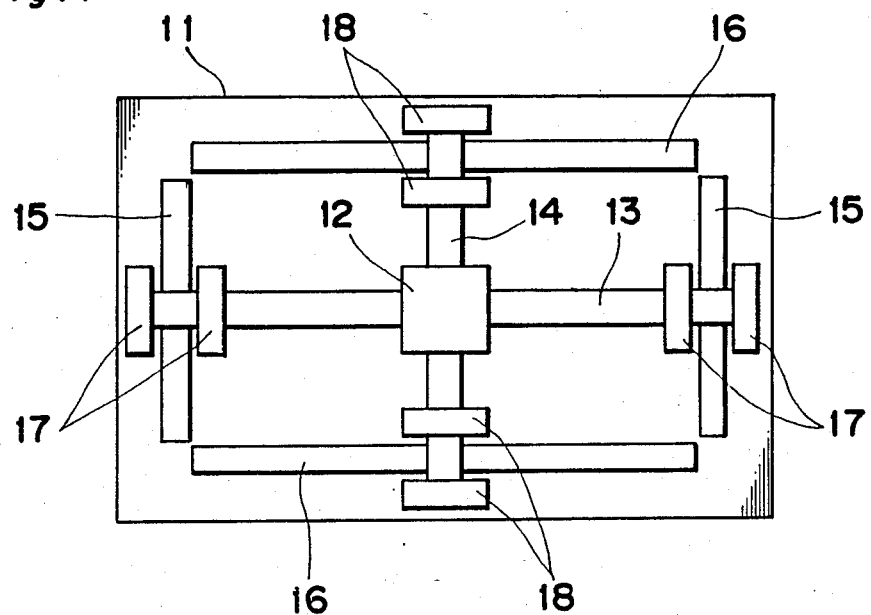
FIG. 1 is a plan view of a static pressure air surface pad.

Before the description of the present invention proceeds, it is to be noted that like parts are designated by like reference numerals throughout the accompanying drawings.

The drawings show a static pressure surface stage or a static pressure air float stage. In FIG. 1 and FIG. 2, a movable guide 13 for guiding a stage of float, surface type 12 in the X-axis direction, a movable guide 14 for guiding it in the Y-axis direction are disposed on a surface plate 11, four pairs of bearings pads 17, 17, 17, 17; 18, 18, 18, 18 opposite onto the inner, outer sides of the stationary guides 15, 16 are disposed at both the end portions of the respective movable guides 13, 14. Accordingly, the stage 12 wherein movable guides 13 are guided by bearing pads 17, 18, is provided in that the bearing pads 17, 18 of said movable guides 13 are oppositely disposed by a pair on both side faces of the stationary guides 15, 16 provided on the surface plate 11.

Even if the reaction forces are applied upon the bearing pads 17, 17 and 18, 18, because of the existence of the stationary guides 15 and 16, by the blow-off operation of the compressed air from the bearing pads 17, 17 and 18, 18, the reaction forces work in the direction opposite to each other and are offset because of the above-described construction so that deflection may not be caused in the movable guide portions 13, 14.

Accordingly, as the movable guides 13, 14 are retained with parts machined with super precision under higher accuracy being shaped as they are, the stage 12 moving along it may be provided with better running accuracy without receiving disturbance during the moving operation.

In addition, the rigidity of the bearing pad portions becomes so higher than the running accuracy in yawing or the like is improved.

Figure 3:
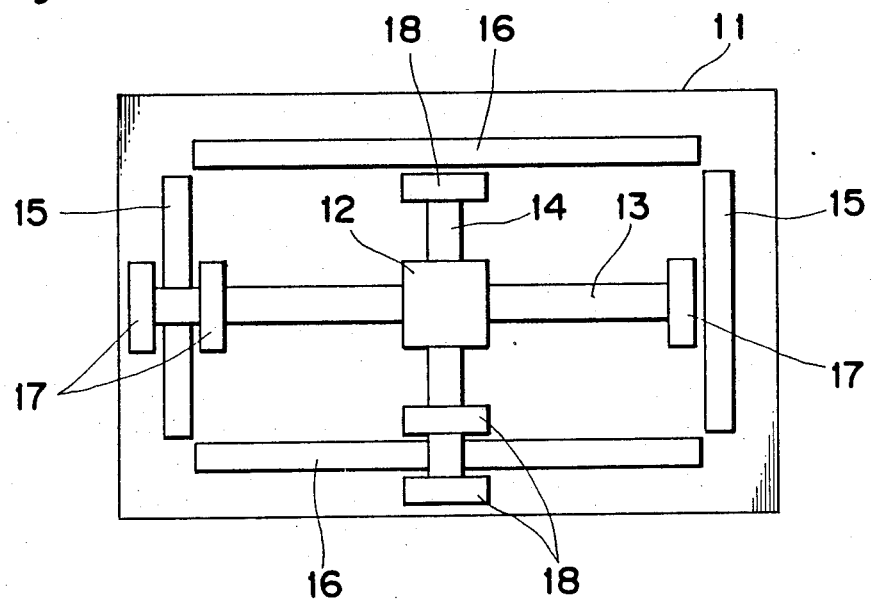
FIG. 3 is a plan view showing the other embodiment.

Although four pairs of bearing pads are disposed on both the end portions of the movable guides 13, 14 in the above-described embodiment, but in the pairs of bearing pads as shown in FIG. 3, the bearing pads may be disposed which grasp the stationary guides only on the sides of the respective one-end portions of the movable guides 13, 14. In the case of the embodiment, the deflection of the movable guides becomes larger as compared with that in the previous embodiment, but it may be controlled to a smaller value as compared with the conventional type shown in FIG. 4 and FIG. 5.

According to the present invention, as the bearing pads of the movable guides are oppositely disposed by pairs on both the side faces of the stationary guides, the bearing reaction forces work in mutually opposite directions and are affect, so that the deflection of the movable guides by the bearing reaction forces may be remarkably reduced, thus resulting in improved stage run accuracy.

Also, as the bearing pads are disposed on both side faces of one stationary guide, the bearing rigidity of the movable guide system becomes twice as much as that in the conventional embodiment, thus resulting in stable yawing run accuracy.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A static pressure air surface stage comprising:
   a surface plate;
   stationary guides fixedly mounted on the surface plate, each stationary guide having two opposed substantially vertical faces; and
   a stage slideably mounted on movable guides, each of said movable guides having a pair of bearing pads fixedly attached to at least one end thereof;
   wherein one pad of each pair of bearing pads is diametrically disposed to the other pad of said pair on said opposed faces of one of said stationary guides.

* * * * *